US010877285B2

(12) United States Patent
MacKinnon

(10) Patent No.: US 10,877,285 B2
(45) Date of Patent: Dec. 29, 2020

(54) WAVELENGTH-BASED SPATIAL MULTIPLEXING SCHEME

(71) Applicant: APPLE INC., Cupertino, CA (US)

(72) Inventor: Neil MacKinnon, San Jose, CA (US)

(73) Assignee: APPLE INC., Cupertino, CA (US)

( * ) Notice: Subject to any disclaimer, the term of this patent is extended or adjusted under 35 U.S.C. 154(b) by 193 days.

(21) Appl. No.: 16/242,019

(22) Filed: Jan. 8, 2019

(65) Prior Publication Data

US 2019/0302467 A1 Oct. 3, 2019

Related U.S. Application Data

(60) Provisional application No. 62/648,957, filed on Mar. 28, 2018.

(51) Int. Cl.
| | |
|---|---|
| *G02B 27/14* | (2006.01) |
| *G02B 27/10* | (2006.01) |
| *H04B 10/40* | (2013.01) |
| *H04J 14/02* | (2006.01) |

(52) U.S. Cl.
CPC ........ *G02B 27/1006* (2013.01); *H04B 10/40* (2013.01); *H04J 14/0209* (2013.01)

(58) Field of Classification Search
CPC .. G02B 27/1006; H04B 10/40; H04J 14/0209
USPC ................................................. 359/629, 634
See application file for complete search history.

(56) References Cited

U.S. PATENT DOCUMENTS

| | | | |
|---|---|---|---|
| 5,552,893 | A | 9/1996 | Akasu |
| 5,646,928 | A | 7/1997 | Wu et al. |
| 5,883,746 | A | 3/1999 | Zelenka |
| 6,043,104 | A | 3/2000 | Uchida |

(Continued)

FOREIGN PATENT DOCUMENTS

| | | |
|---|---|---|
| DE | 102011001387 A1 | 9/2012 |
| EP | 2827175 A2 | 1/2015 |

(Continued)

OTHER PUBLICATIONS

Montrose Laboratories LLC., PCT Application # PCT/US2017/066919 filed Dec. 12, 2017.

(Continued)

*Primary Examiner* — William Choi
(74) *Attorney, Agent, or Firm* — Kligler & Associates Patent Attorneys Ltd

(57) ABSTRACT

An optoelectronic apparatus includes an enclosure including a front face and a rear face. An array of emitters is contained in the enclosure and configured to generate first beams of optical radiation at a first wavelength and second beams of radiation at a second wavelength different from the first wavelength. Projection optics contained in the enclosure have an entrance face and an exit face and are configured to receive the beams of optical radiation through the entrance face and to project the beams through the exit face. A wavelength-based spatial multiplexer is contained in the enclosure and positioned to intercept the projected beams and configured to direct the first beams through the front face and the second beams through the rear face. A controller is coupled to selectively drive the array so as to control relative proportions of the optical radiation that are emitted through the front and rear faces.

20 Claims, 2 Drawing Sheets

(56) References Cited

U.S. PATENT DOCUMENTS

| | | |
|---|---|---|
| 6,624,919 B2 | 9/2003 | Lambert |
| 7,133,022 B2 | 11/2006 | Grabert |
| 7,544,945 B2 | 6/2009 | Tan et al. |
| 9,400,177 B2 | 7/2016 | Pesach |
| 9,553,423 B2 | 1/2017 | Chen et al. |
| 9,736,459 B2 | 8/2017 | Mor et al. |
| 9,880,265 B2 | 1/2018 | Schneider et al. |
| 9,885,778 B2 | 2/2018 | Dussan |
| 9,997,551 B2 | 6/2018 | Mandai et al. |
| 10,063,835 B2 | 8/2018 | Mor et al. |
| 10,447,424 B2 * | 10/2019 | MacKinnon .............. F21V 9/14 |
| 2005/0178950 A1 | 8/2005 | Yoshida |
| 2007/0242254 A1 | 10/2007 | Nagasaka |
| 2009/0016710 A1 | 1/2009 | Nozaki et al. |
| 2011/0187878 A1 | 8/2011 | Mor et al. |
| 2012/0140184 A1 | 6/2012 | Bruzzone |
| 2013/0182227 A1 | 7/2013 | Schuck |
| 2015/0077645 A1 | 3/2015 | Lin |
| 2015/0131080 A1 | 5/2015 | Retterath et al. |
| 2016/0161752 A1 | 6/2016 | Negoita et al. |
| 2016/0373704 A1 | 12/2016 | Akiyama |
| 2017/0052065 A1 | 2/2017 | Sharma et al. |
| 2017/0146803 A1 | 5/2017 | Kishigami et al. |
| 2017/0176579 A1 | 6/2017 | Niclass et al. |
| 2017/0219695 A1 | 8/2017 | Hall et al. |
| 2017/0242100 A1 | 8/2017 | Hinokuma et al. |
| 2018/0062345 A1 | 3/2018 | Bills et al. |
| 2018/0073863 A1 | 3/2018 | Watanabe |
| 2018/0084241 A1 | 3/2018 | Chen et al. |
| 2019/0107728 A1 | 4/2019 | Kim |

FOREIGN PATENT DOCUMENTS

| | | |
|---|---|---|
| WO | 2013062932 A1 | 5/2013 |
| WO | 2014093085 A1 | 6/2014 |
| WO | 2015199615 A1 | 12/2015 |

OTHER PUBLICATIONS

Charbon et al., "SPAD-Based Sensors", TOF Range-Imaging Cameras, Springer-Verlag Berlin Heidelberg, pp. 11-38, 2013.

International Application # PCT/US2017/066919 search report dated Sep. 27, 2018.

MacKinnon et al., U.S. Appl. No. 16/179,951, filed Nov. 4, 2018.

International Application # PCT/US2018/66629 search report dated Apr. 3, 2019.

U.S. Appl. No. 16/544,972 office action dated Oct. 1, 2019.

U.S. Appl. No. 16/045,779 office action dated Oct. 10, 2019.

* cited by examiner

WAVELENGTH-BASED SPATIAL MULTIPLEXING SCHEME

CROSS-REFERENCE TO RELATED APPLICATION

The present patent application claims the benefit of U.S. Provisional Patent Application 62/648,957, filed Mar. 28, 2018, which is incorporated herein by reference.

FIELD OF THE INVENTION

The present invention relates generally to optoelectronic systems, and particularly to illumination devices.

BACKGROUND

Portable electronic devices, such as cellular phones, commonly employ one or more integral light sources. These light sources may provide illumination for a scene recorded by a camera integrated into the device. As an example, U.S. Pat. No. 9,400,177 describes a pattern projector, including a light source, configured to emit a beam of light. The inventors describe a system for 3D mapping, which may be produced as a very compact unit, for example being included in a mobile station (e.g., PDA, cellular phone) and/or a portable computer.

SUMMARY

Embodiments of the present invention that are described herein provided improved sources of optical radiation.

There is therefore provided, in accordance with an embodiment of the invention, an optoelectronic apparatus, which includes an enclosure including a front face and a rear face. An array of emitters is contained in the enclosure and configured to generate first beams of optical radiation at a first wavelength and second beams of radiation at a second wavelength different from the first wavelength. Projection optics contained in the enclosure have an entrance face and an exit face and are configured to receive the beams of optical radiation through the entrance face and to project the beams through the exit face. A wavelength-based spatial multiplexer is contained in the enclosure and positioned to intercept the projected beams and configured to direct the first beams through the front face and the second beams through the rear face. A controller is coupled to selectively drive the array so as to control relative proportions of the optical radiation that are emitted through the front and rear faces.

In some embodiments, the wavelength-based spatial multiplexer includes a dichroic beamsplitter configured to reflect the beams of the first wavelength toward the front face of the enclosure and to transmit the beams of the second wavelength. In a disclosed embodiment, the wavelength-based spatial multiplexer includes a mirror positioned to intercept the beams of the second wavelength transmitted by the dichroic beamsplitter and to reflect the intercepted beams toward the rear face of the enclosure. In one embodiment, the mirror is configured to transmit a portion of the intercepted beams, and the apparatus includes an optical sensor positioned to intercept the portion of the beams and configured to emit a signal to the controller responsively to an optical power of the portion of the intercepted beams.

In some embodiments, the array includes a plurality of pairs of first and second emitters, wherein the first emitters are configured to emit the first beams of optical radiation at the first wavelength and the second emitters are configured to emit the second beams of radiation at the second wavelength. The emitters may include lasers or, alternatively, broadband emitters overlaid with spectral filters.

Additionally or alternatively, the projection optics include first cylindrical lenses, which are aligned respectively with the pairs of emitters, so that each first cylindrical lens intercepts one first beam and one second beam, and have respective, mutually parallel first cylindrical axes, and a second cylindrical lens positioned adjacent to the first cylindrical lenses and having a second cylindrical axis perpendicular to the first cylindrical axes.

There is also provided, in accordance with an embodiment of the invention, an optoelectronic apparatus, including an array of pairs of first and second emitters, wherein the first emitters are configured to emit respective first beams of optical radiation at a first wavelength, and the second emitters are configured to emit respective second beams of optical radiation at a second wavelength. Projection optics having an entrance face and an exit face are configured to receive the first and second beams of the optical radiation through the entrance face and to project the beams through the exit face. A dichroic beamsplitter is positioned to intercept the projected beams and configured to transmit the optical radiation of the first wavelength and to reflect the optical radiation of the second wavelength.

In some embodiments, the projection optics are configured to provide a uniform illumination. Alternatively, the projection optics are configured to provide a patterned illumination.

Additionally or alternatively, the apparatus includes a controller, which is coupled to drive the first and second emitters so as to set relative proportions of the optical radiation that are transmitted and reflected.

There is additionally provided, in accordance with an embodiment of the invention, a method for projecting optical radiation, which includes providing an enclosure including a front face and a rear face and containing an array of emitters, configured to generate first beams of optical radiation at a first wavelength and second beams of radiation at a second wavelength different from the first wavelength, and projection optics, having an entrance face and an exit face and configured to receive the beams of optical radiation through the entrance face and to project the beams through the exit face. A wavelength-based spatial multiplexer is positioned in the enclosure to intercept the projected beams and direct the first beams through the front face and the second beams through the rear face. The array is selectively driven so as to control relative proportions of the optical radiation that are emitted through the front and rear faces.

The present invention will be more fully understood from the following detailed description of the embodiments thereof, taken together with the drawings in which:

DETAILED DESCRIPTION OF EMBODIMENTS

Figure 1:
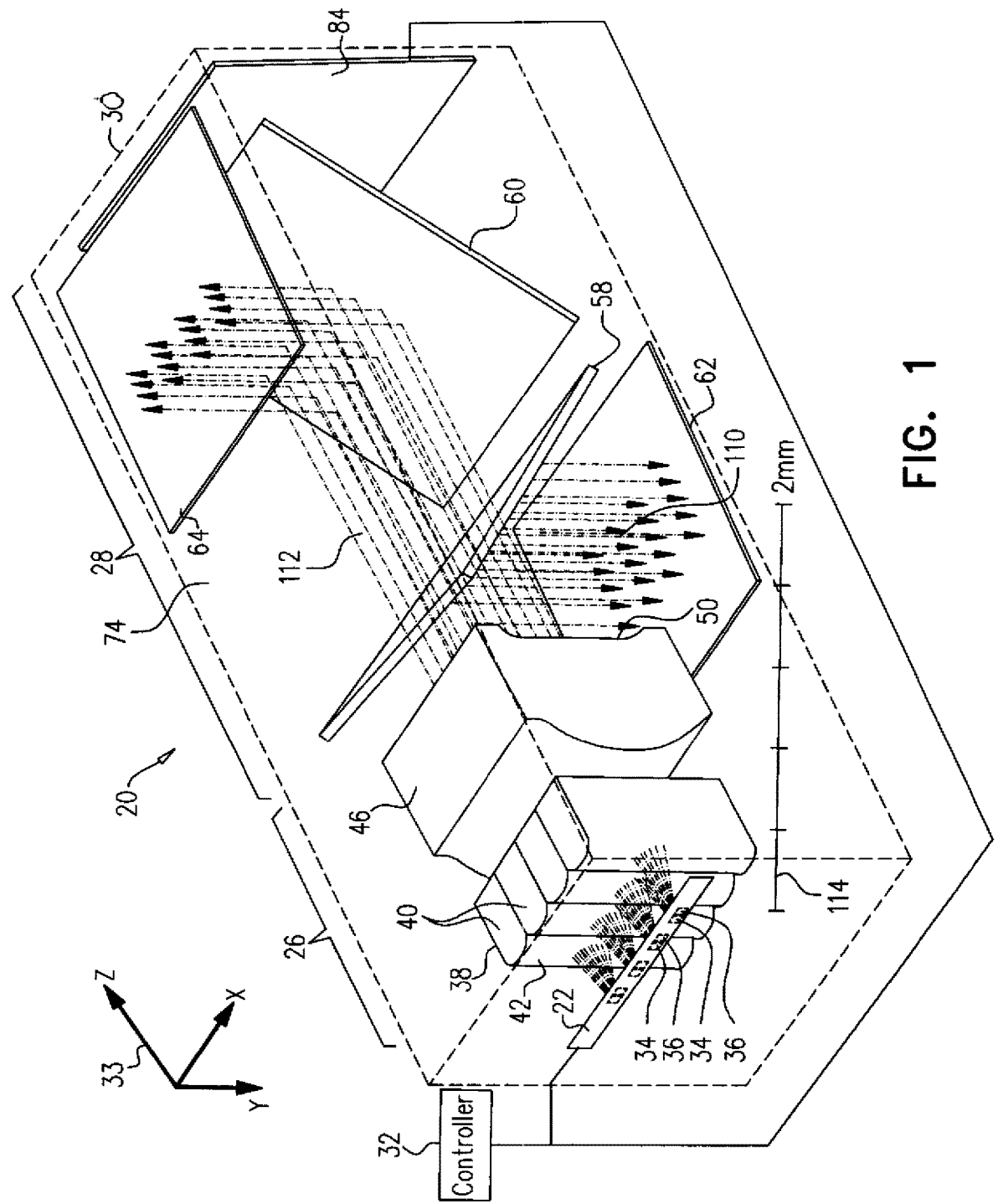
FIG. 1 is a schematic perspective illustration of an optoelectronic apparatus, in accordance with an embodiment of the invention.

A portable electronic device may employ more than one light source for providing illumination for sub-systems integral to the device, such as front- and rear-side cameras. Realizing these light sources and their switching mechanisms within the constraints of volume and cost of a typical portable electronic device, such as a cellular phone, is challenging.

Embodiments of the present invention that are described herein address these problems by providing a compact optoelectronic apparatus featuring a spatially multiplexed light source.

In the disclosed embodiments, the optoelectronic apparatus includes an enclosure, with an array of emitters of beams of optical radiation at two different wavelengths, projection optics, a wavelength-based spatial multiplexer, and a controller contained in the enclosure. (The terms "optical radiation" and "light" as used in the present description and in the claims refer generally to any and all of visible, infrared, and ultraviolet radiation.)

The projection optics are common to all of the emitted beams, and in some embodiments include an array of first cylindrical lenses with mutually parallel first cylinder axes and a second cylindrical lens, adjacent to the array of first cylindrical lenses, with a second cylinder axis perpendicular to the first axes. Depending on the optical parameters, this arrangement can be used to create uniform flood lighting or patterned radiation over the field of interest.

The beams of optical radiation emitted by the array of emitters are received by the projection optics and projected toward the wavelength-based spatial multiplexer, comprising, for example, a dichroic beamsplitter. The spatial multiplexer directs the beams, depending on their wavelength, to be emitted through the front face or the rear face of the enclosure.

The beams emitted through the front or rear faces may have different functionalities. For instance, the beams emitted through the front face may project patterned illumination onto a scene, enabling 3D mapping based on triangulation, whereas a scanner may be added to scan the beams emitted through the rear face, enabling 3D mapping based on time-of-flight (TOF). Alternatively or additionally, the beams may be used for other purposes, such as uniform flood lighting.

In an embodiment of the present invention, the array of emitters includes first emitters emitting first beams of optical radiation at a first wavelength and second emitters emitting second beams of optical radiation at a second wavelength, different from the first wavelength. Each first cylindrical lens of the lens array receives one beam of each wavelength and projects them toward the second cylindrical lens, which, in turn, projects the beams toward the wavelength-based spatial multiplexer. The spatial multiplexer receives the first and second beams, and reflects the first beams and transmits the second beams. The first, reflected beams are emitted through one face of the enclosure, for example the front face.

A mirror, either free standing or embedded in a cube, can be included in the spatial multiplexer for deflecting the second beams transmitted through the beamsplitter. The second, transmitted beams impinge on and are reflected by the mirror, and are thus emitted through the opposite face of the enclosure, for example the rear face.

The controller drives either the first or second emitters or both, so that beams can be directed through either the front face, rear face, or both faces of the enclosure. The controller may further adjust the relative proportions of the optical powers emitted by the first and the second emitters, respectively, so as to control the relative proportions of the optical radiation that are emitted through the front and rear faces In the present description, the terms "front face" and "rear face" are used by way of example only, and in general can denote any two faces of the enclosure. Furthermore, although some of the embodiments described herein are particularly well suited for integration in a narrow enclosure as described above, the principles of the present invention may also be applied to provide wavelength-based spatial multiplexing in other settings, irrespective of any particular type of enclosure.

In a further embodiment, the mirror of the spatial multiplexer is configured to transmit a portion of the optical radiation impinging on it. An optical sensor receives this leaked portion of the optical radiation, and emits a signal that can be used, for example, for measuring the optical power of the beams transmitted by the spatial multiplexer or, if in a scanning system, the relative position of the optical output.

FIG. 1 is a schematic perspective illustration of an optoelectronic apparatus 20, in accordance with an embodiment of the invention. Optoelectronic apparatus 20 includes an emitter array 22, projection optics 26, a wavelength-based spatial multiplexer 28, and a controller 32, which are all typically contained in an enclosure 30. Enclosure 30 comprises a front face 72 and a rear face 74. For the sake of simplicity and clarity, any actuating mechanisms that would be provided to scan the optical output are omitted.

Figure 2:
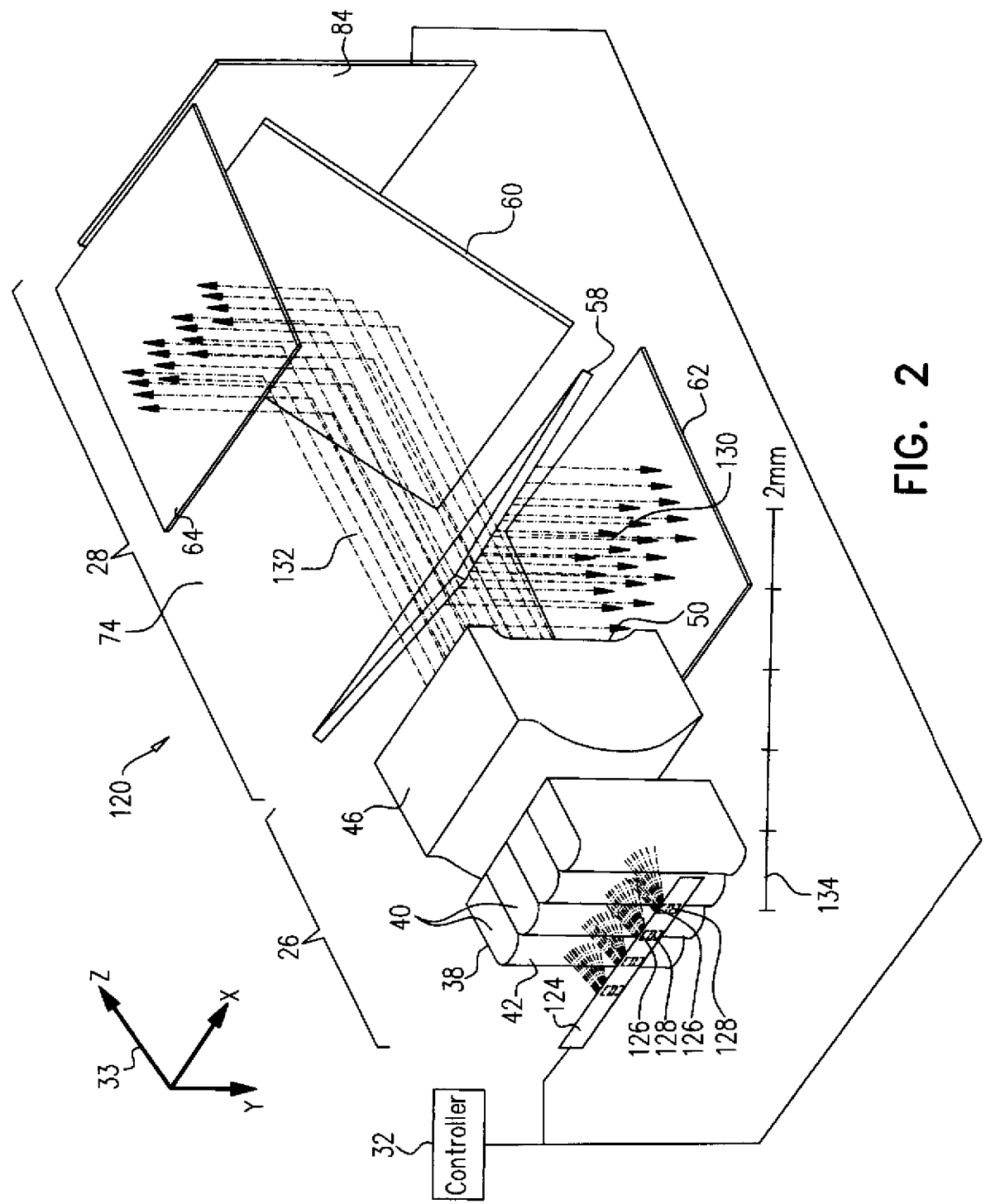
FIG. 2 is a schematic perspective illustration of an optoelectronic apparatus, in accordance with another embodiment of the invention.

Cartesian coordinate axes 33 are shown in FIGS. 1-2 for reference.

Emitter array 22 includes first emitters 34 and second emitters 36. First emitters 34 emit optical radiation at a first wavelength $\lambda_1$, and second emitters 36 emit optical radiation at a second wavelength $\lambda_2$. Wavelengths $\lambda_1$ and $\lambda_2$ differ from each other sufficiently to ensure that the emission spectra of the first and second emitters do not overlap. Both first emitters 34 and second emitters 36 are arranged in emitter array 22 along a line in the x-direction of Cartesian coordinate axes 33, with alternating first and second emitters, so as to form pairs of first and second emitters. Emitters 34 and 36 may comprise, for example, vertical-cavity surface emitting lasers (VCSELs) or light-emitting diodes (LEDs) emitting respectively at wavelengths $\lambda_1$ and $\lambda_2$, or broadband emitters of any suitable type, which are overlaid with spectral filters centered respectively at wavelengths $\lambda_1$ and $\lambda_2$.

Projection optics 26 include a lens array 38 of first cylindrical lenses 40, wherein the entrance faces of the first cylindrical lenses define an entrance face 42 of projection optics 26. First cylindrical lenses 40 are oriented so that their cylinder axes are mutually parallel along the y-axis (perpendicular to the line of first and second emitters 34 and 36, respectively). Each first cylindrical lens 40 is aligned with a pair of first and second emitters 34 and 36, respectively. Projection optics 26 further include a second cylindrical lens 46, whose exit face defines an exit face 50 of projection optics 26. Second cylindrical lens 46 is positioned adjacent to lens array 38, and oriented with its cylinder axis along the x-axis (perpendicular to the cylinder axes of first cylindrical lenses 40).

Spatial multiplexer 28 includes a dichroic beamsplitter 58, positioned adjacent to exit face 50 of projection optics 26, and oriented typically at an angle of 45 degrees with respect to the z-axis. Dichroic beamsplitter 58 is configured to reflect optical radiation at wavelength $\lambda_1$ emitted by first emitters 34 and to transmit optical radiation at wavelength $\lambda_2$ emitted by second emitters 36. Spatial multiplexer 28 also includes a partially-transmitting mirror 60, positioned adjacent to dichroic beamsplitter 58 and oriented typically at an angle of −45 degrees with respect to the z-axis, i.e., in a direction perpendicular to that of the dichroic beamsplitter in the present example. Spatial multiplexer 28 further includes an optical sensor 84 added behind the partially-transmitting mirror.

Controller 32 is coupled to drive emitter array 22 as well as to receive signals from optical sensor 84. Controller 32 may be positioned either inside or outside enclosure 30. In some embodiments, the controller is programmed in software and/or firmware to carry out the functions that are described herein. Additionally or alternatively, at least some of the functions of the controller may be carried out by hardware logic circuits, which may be hard-wired or programmable. In either case, the controller has suitable interfaces for receiving and transmitting data and instructions to and from other elements of the optoelectronic apparatus, as well as other apparatus with which the optoelectronic apparatus is integrated.

The functioning of optoelectronic apparatus 20 is shown schematically in FIG. 1, with first optical rays 110 and second optical rays 112 denoting the beams of optical radiation emitted by first and second emitters 34 and 36, respectively, and projected by the apparatus. The beams are received in projection optics 26 through entrance face 42, with each first cylindrical lens 40 receiving one beam from one first emitter 34 and one beam from one second emitter 36. First cylindrical lenses 40 collimate the beams in the x-direction and project them toward second cylindrical lens 46, which in turn collimates the beams in the y-direction and projects them through exit face 50 toward dichroic beamsplitter 58.

Beams from first emitters 34, depicted by first optical rays 110, are reflected by dichroic beamsplitter 58 to a first exit window 62 and are emitted through the window. Beams from second emitters 36, depicted by second optical rays 112, are transmitted by dichroic beamsplitter 58 and reflected by partially transmitting mirror 60 to a second exit window 64 and are emitted through the window. Exit windows 62 and 64 are located respectively on front and rear faces 72 and 74 of enclosure 30. Exit windows 62 and 64 are manufactured of a material that is transparent to wavelengths $\lambda_1$ and $\lambda_2$. Alternatively, exit windows 62 and 64 may simply be openings in enclosure 30. A portion of second optical rays 112 passes through partially transmitting mirror 60 and is received by optical sensor 84 (transmitted rays not shown). Optical sensor 84, coupled to controller 32, may be used, for example, for measuring the power emitted by second emitters 36.

When controller 32 energizes only first emitters 34, only first optical rays 110 are present, and optical radiation is emitted only through first exit window 62. Similarly, when controller 32 energizes only second emitters 36, only second optical rays 112 are present, and optical radiation is emitted only through second exit window 64.

The compact size of optoelectronic apparatus 20 is indicated by a scale 114, wherein the length of the scale is 2 mm. Alternatively, the elements of apparatus 20 may be made to a larger or smaller scale, depending on application requirements.

FIG. 2 is a schematic perspective illustration of an optoelectronic apparatus 120, in accordance with another embodiment of the invention. For the components substantially identical to those in FIG. 1, the same labels are used. Cartesian coordinate axes 33 are again shown for reference, but enclosure 30 is omitted for the sake of simplicity.

Optoelectronic apparatus 120 includes an emitter array 124 of first emitters 126 and second emitters 128. First emitters 126 emit optical radiation at a first wavelength $\lambda_1$, and second emitters 128 emit optical radiation at a second wavelength $\lambda_2$. As in the previous embodiment, emitters 126 and 128 may comprise, for example, VCSELs, LEDs, or broadband sources with suitable filters. First emitters 126 and second emitters 128 are positioned, respectively, along two parallel straight lines in the x-direction, with each first emitter 126 aligned above a second emitter 128 in the y-direction, forming pairs of first and second emitters so that each pair is aligned with one cylindrical lens 40. The remaining elements of apparatus 120 are similar to those shown and described above.

The functioning of optoelectronic apparatus 120 is shown schematically in FIG. 2, with first optical rays 130 and second optical rays 132 denoting the beams of optical radiation emitted by first and second emitters 126 and 128, respectively, and passed through the apparatus.

The beams are received through entrance face 42, with each first cylindrical lens 40 receiving one beam from one first emitter 126 and one beam from one second emitter 128. Projection optics 26 collimate the beams in the x- and y-directions as in the previous embodiment depicted in FIG. 1, and project them through exit face 50 to dichroic beamsplitter 58. Beams from first emitters 126, depicted by first optical rays 130, are reflected by dichroic beamsplitter 58 to first exit window 62 and are emitted through the window. Beams from second emitters 128, depicted by second optical rays 132, are transmitted by dichroic beamsplitter 58 and reflected by partially-transmitting mirror 60 to second exit window 64 and are emitted through the window.

When controller 32 energizes only first emitters 126, only first optical rays 130 are present, and optical radiation is emitted only through first exit window 62. Similarly, when controller 32 energizes only second emitters 128, only second optical rays 132 are present, and optical radiation is emitted only through second exit window 64.

The compact size of optoelectronic apparatus 120 is indicated by a scale 134, wherein the length of the scale is 2 mm.

Although the disclosed embodiments refer to optical beams being emitted through the front face and the rear face of the enclosure, the wavelength-based spatial multiplexer may be modified in a straightforward manner to emit the beams through other faces of the enclosure, such as through faces at right angles to each other or through two windows on the same face. Furthermore, although the embodiments described above use pairs of emitters with different wavelengths, in alternative embodiments (not shown in the figures), each pair of emitters may be replaced by a single tunable emitter, such as a tunable laser diode, which can be controlled to emit radiation at either $\lambda_1$ or $\lambda_2$, or by a single broadband emitter with the addition of a tunable wavelength filter between the emitters and the spatial multiplexer.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic apparatus, comprising:
   an enclosure comprising a front face and a rear face;
   an array of emitters, which is contained in the enclosure and configured to generate first beams of optical radiation at a first wavelength and second beams of radiation at a second wavelength different from the first wavelength;

projection optics contained in the enclosure and having an entrance face and an exit face and configured to receive the beams of optical radiation through the entrance face and to project the beams through the exit face;

a wavelength-based spatial multiplexer, which is contained in the enclosure and positioned to intercept the projected beams and configured to direct the first beams through the front face and the second beams through the rear face; and a controller, which is coupled to selectively drive the array so as to control relative proportions of the optical radiation that are emitted through the front and rear faces.

2. The optoelectronic apparatus according to claim 1, wherein the wavelength-based spatial multiplexer comprises a dichroic beamsplitter configured to reflect the beams of the first wavelength toward the front face of the enclosure and to transmit the beams of the second wavelength.

3. The optoelectronic apparatus according to claim 2, wherein the wavelength-based spatial multiplexer comprises a mirror positioned to intercept the beams of the second wavelength transmitted by the dichroic beamsplitter and to reflect the intercepted beams toward the rear face of the enclosure.

4. The optoelectronic apparatus according to claim 3, wherein the mirror is configured to transmit a portion of the intercepted beams, and the apparatus comprises an optical sensor positioned to intercept the portion of the beams and configured to emit a signal to the controller responsively to an optical power of the portion of the intercepted beams.

5. The optoelectronic apparatus according to claim 1, wherein the array comprises a plurality of pairs of first and second emitters, wherein the first emitters are configured to emit the first beams of optical radiation at the first wavelength and the second emitters are configured to emit the second beams of radiation at the second wavelength.

6. The optoelectronic apparatus according to claim 5, wherein the emitters comprise lasers.

7. The optoelectronic apparatus according to claim 5, wherein the emitters comprise broadband emitters overlaid with spectral filters.

8. The optoelectronic apparatus according to claim 5, wherein the projection optics comprise:

first cylindrical lenses, which are aligned respectively with the pairs of emitters, so that each first cylindrical lens intercepts one first beam and one second beam, and have respective, mutually parallel first cylindrical axes; and a second cylindrical lens positioned adjacent to the first cylindrical lenses and having a second cylindrical axis perpendicular to the first cylindrical axes.

9. An optoelectronic apparatus, comprising:

an array of pairs of first and second emitters, wherein the first emitters are configured to emit respective first beams of optical radiation at a first wavelength, and the second emitters are configured to emit respective second beams of optical radiation at a second wavelength;

projection optics having an entrance face and an exit face and configured to receive the first and second beams of the optical radiation through the entrance face and to project the beams through the exit face; and a dichroic beamsplitter, which is positioned to intercept the projected beams and configured to transmit the optical radiation of the first wavelength and to reflect the optical radiation of the second wavelength.

10. The optoelectronic apparatus according to claim 9, wherein the projection optics comprise:

first cylindrical lenses, which are aligned respectively with the pairs of emitters, so that each first cylindrical lens intercepts one first beam and one second beam, and have respective, mutually parallel first cylindrical axes; and a second cylindrical lens positioned adjacent to the first cylindrical lenses and having a second cylindrical axis perpendicular to the first cylindrical axes.

11. The optoelectronic apparatus according to claim 9, wherein the projection optics are configured to provide a uniform illumination.

12. The optoelectronic apparatus according to claim 9, wherein the projection optics are configured to provide a patterned illumination.

13. The optoelectronic apparatus according to claim 9, and comprising a controller, which is coupled to drive the first and second emitters so as to set relative proportions of the optical radiation that are transmitted and reflected.

14. A method for projecting optical radiation, comprising:

providing an enclosure comprising a front face and a rear face and containing an array of emitters, configured to generate first beams of optical radiation at a first wavelength and second beams of radiation at a second wavelength different from the first wavelength, and projection optics, having an entrance face and an exit face and configured to receive the beams of optical radiation through the entrance face and to project the beams through the exit face;

positioning a wavelength-based spatial multiplexer in the enclosure to intercept the projected beams and direct the first beams through the front face and the second beams through the rear face; and selectively driving the array so as to control relative proportions of the optical radiation that are emitted through the front and rear faces.

15. The method according to claim 14, wherein the wavelength-based spatial multiplexer comprises a dichroic beamsplitter configured to reflect the beams of the first wavelength toward the front face of the enclosure and to transmit the beams of the second wavelength.

16. The method according to claim 15, wherein the wavelength-based spatial multiplexer comprises a mirror positioned to intercept the beams of the second wavelength transmitted by the dichroic beamsplitter and to reflect the intercepted beams toward the rear face of the enclosure.

17. The method according to claim 16, wherein the mirror is configured to transmit a portion of the intercepted beams, and wherein selectively driving the array comprises intercepting the portion of the beams and driving the array responsively to an optical power of the portion of the intercepted beams.

18. The method according to claim 14, wherein the array comprises a plurality of pairs of first and second emitters, wherein the first emitters are configured to emit the first beams of optical radiation at the first wavelength and the second emitters are configured to emit the second beams of radiation at the second wavelength.

19. The method according to claim 18, wherein the emitters comprise lasers.

20. The method according to claim 18, wherein the projection optics comprise:

first cylindrical lenses, which are aligned respectively with the pairs of emitters, so that each first cylindrical lens intercepts one first beam and one second beam, and have respective, mutually parallel first cylindrical axes; and a second cylindrical lens positioned adjacent to the first cylindrical lenses and having a second cylindrical axis perpendicular to the first cylindrical axes.

\* \* \* \* \*